United States Patent [19]

Borst et al.

[11] 3,863,593
[45] Feb. 4, 1975

[54] ROTARY CABLE STEERING SYSTEM

[75] Inventors: Gaylord M. Borst; William J. Shimanckas, both of Waukegan, Ill.

[73] Assignee: Outboard Marine Corporation, Waukegan, Ill.

[22] Filed: May 2, 1973

[21] Appl. No.: 356,510

Related U.S. Application Data

[62] Division of Ser. No. 244,682, April 17, 1972, Pat. No. 3,774,568.

[52] U.S. Cl.................... 115/18 R, 74/485, 74/507
[51] Int. Cl............................................. B63n 21/26
[58] Field of Search............ 115/18, 35; 114/144 R; 74/789, 801, 501 R, 507, 485, 509

[56] References Cited
UNITED STATES PATENTS

| | | | |
|---|---|---|---|
| 2,212,321 | 8/1940 | Lacharite et al...................... | 74/801 |
| 3,111,042 | 11/1963 | Hoover............................... | 74/509 |
| 3,115,791 | 12/1963 | Dean.................................. | 74/785 |
| 3,265,362 | 8/1966 | Moody................................ | 74/801 |

Primary Examiner—Trygve M. Blix
Assistant Examiner—Sherman D. Basinger
Attorney, Agent, or Firm—Michael, Best & Friedrich

[57] ABSTRACT

Disclosed herein is a marine steering device comprising a housing adapted to be mounted on a boat hull and including spaced walls defining an interior chamber with an annular internal gear therein, a steering wheel shaft rotatably mounted by the housing, extending through one of the spaced walls, and including a first part extending in the chamber and a second part extending exteriorly of the chamber, a steering wheel mounted on the second steering wheel shaft part exteriorly of the housing, a carrier fixed on the first steering wheel shaft part in the chamber for common rotation with the steering wheel, an output shaft rotatably mounted by the housing, extending through the other of the spaced walls in co-axial relation to the steering wheel shaft, and having thereon a pinion located in the chamber and having common rotation with the output shaft, and gearing mounted on the carrier and in mesh with the internal gear and the pinion for rotatably driving the output shaft by the steering wheel shaft.

6 Claims, 4 Drawing Figures

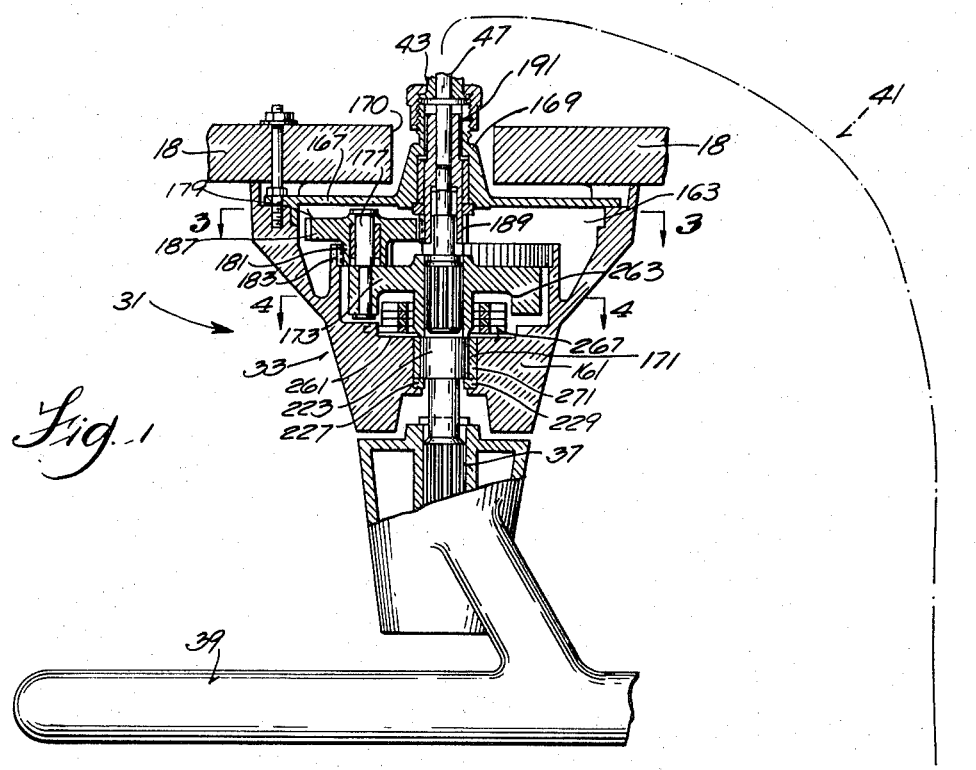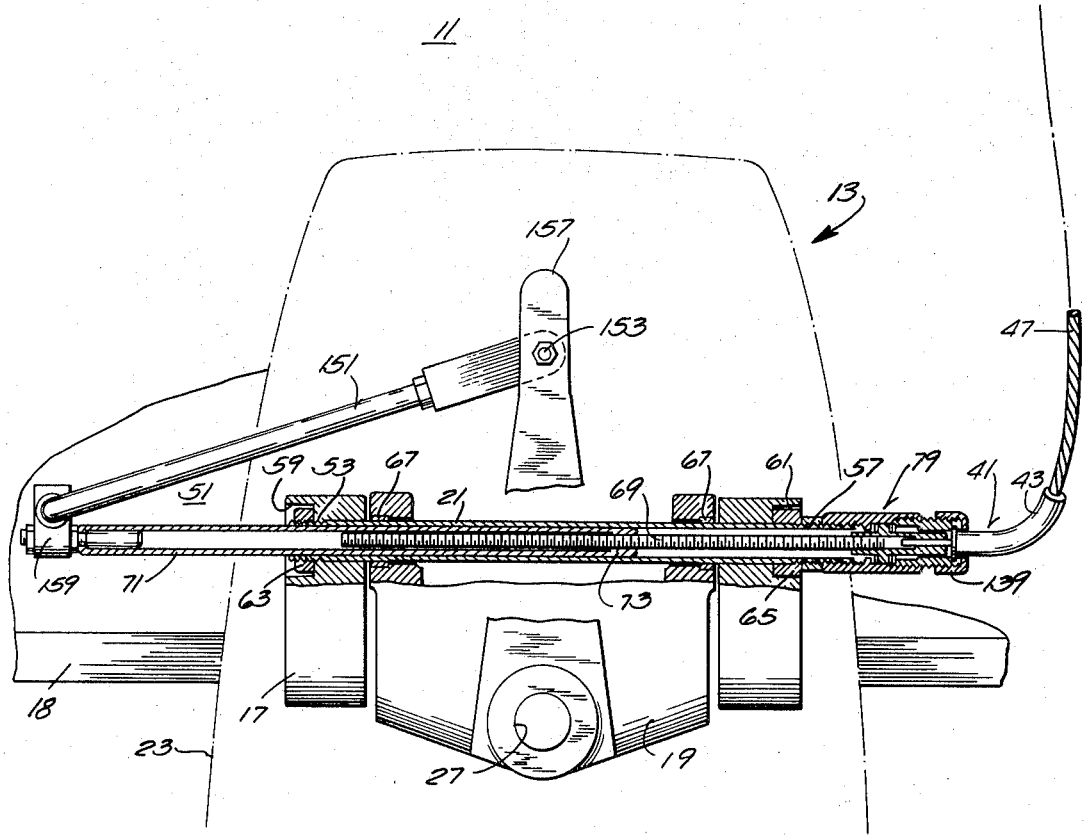

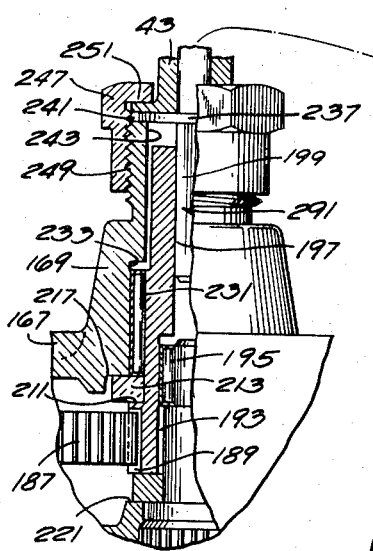
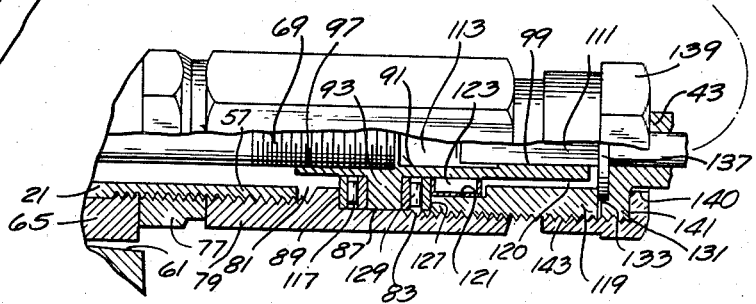
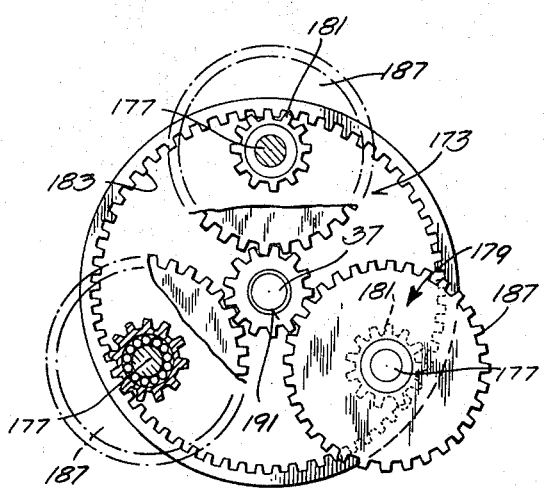
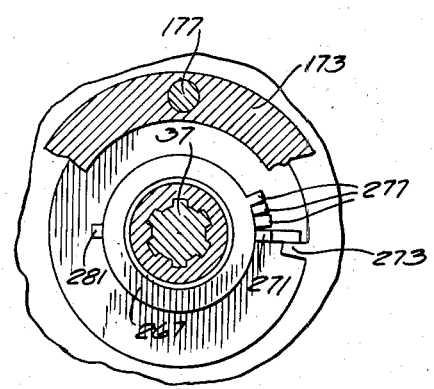

3,863,593

ROTARY CABLE STEERING SYSTEM

This is a division of application Ser. No. 244,682 filed Apr. 17, 1972, now Pat. No. 3,774,568.

BACKGROUND OF THE INVENTION

The invention relates to marine steering systems and particularly to remotely actuated steering systems for marine propulsion devices such as stern drive units and outboard motors. The invention further relates to marine propulsion device steering mechanisms and to mechanisms which are adapted to be located remotely from marine propulsion devices and are operable for steering such marine propulsion devices.

Attention is directed to the U.S. Post Pat. No. 2,875,722 issued Mar. 3, 1959, which discloses an outboard motor remote steering control including a flexible push-pull actuating rod connected to an element reciprocably disposed within the hollow interior of a tubular tilt pin and arranged so as to steer the outboard motor in response to axial displacement of the inner core of the flexible push-pull cable.

Attention is also directed to the later issued U.S. Hoover Pat. No. 3,111,042 granted Nov. 19, 1963, which discloses a boat steering assembly including a flexible rotary cable including a rotary core member connected to an extensible motor including a screw shaft connected to the core member and coupled through ball bearings with an extensible member so as to axially displace the extensible member in response to rotation of the screw shaft by the core member to thereby steer the outboard motor. It is noted that the Hoover extensible motor is fixed to the boat hull independently of the marine propulsion device and does not extend along the tilt pin axis or within a tilt pin.

Attention is further directed to the still later issued U.S. Nelson Pat. No. 3,283,738 granted Nov. 8, 1966, which discloses use of an electric motor to drive an extensible motor to steer an outboard motor in generally the same manner as disclosed in the U.S. Hoover Pat. No. 3,111,042.

SUMMARY OF THE INVENTION

The invention provides a marine steering system in which a remote steering device rotatably drives a rotatable element which is an interior part of a flexible cable and which is connected to a worm shaft or rotary member within a hollow tilt pin of a marine propulsion device, which worm shaft, in turn, is connected through a linkage to the propulsion unit of a marine propulsion device so as to steerably swing the propulsion unit in response to rotation of a steering wheel on the remote steering device.

The invention also provides a marine propulsion device including a propulsion unit connected to a hollow tilt pin by means affording swinging movement of the propulsion unit about the axis of the tilt pin and affording swinging movement of the propulsion unit about a steering axis transverse to the tilt pin, together with means connected to the propulsion unit and including a rotary member extending at least in part in the hollow tilt pin for steering the propulsion unit in response to rotation of the rotary member. In one embodiment of the invention, the rotary member includes a threaded portion located in the hollow tilt pin and the propulsion unit steering means further includes a second member extending within the tilt pin for rotary and axial movement relative to the tilt pin and including a nut engaged with the threaded portion, together with linkage means connecting the second member to the propulsion unit for preventing rotary movement of the second member about the tilt pin axis independently of the propulsion unit and for swinging the propulsion unit about the steering axis in response to movement of the second member axially of the tilt pin incident to rotation of the rotary member.

The invention also provides a marine steering device which comprises a housing defining a chamber with an annular gear located therein, together with a steering wheel shaft rotatably mounted on the housing and including a first part in the chamber and a second part exterior of the chamber, a steering wheel mounted on the steering wheel shaft part exterior of the housing, a carrier fixed on the steering wheel shaft part in the chamber, an output shaft mounted on the housing and having thereon a pinion located in the chamber, and means mounted on the carrier and in mesh with the internal gear and the pinion for rotatably driving the output shaft by the steering wheel shaft.

In one embodiment in accordance with the invention, the means for driving the output shaft from the steering wheel shaft comprises a plurality of compound gear members each rotatably mounted on the carrier and each including a pinion portion in mesh with the internal gear and a gear portion in mesh with the pinion.

Another feature of the invention resides in the further provision of means in the steering device for limiting rotation of one of the steering wheel shaft and the output shaft.

Still another feature of the invention resides in the arrangement in which the steering wheel shaft and the output shaft are mounted in coaxial and telescopic relation to each other.

One of the principal objects of the invention is the provision of a marine steering system including a minimum number of exposed and movable parts.

Another of the principal objects of the invention is the provision of a marine propulsion steering system in which exposed moving parts motion in the connection between a remote steering device and connected marine propulsion device are avoided.

Another of the principal objects of the invention is the provision of a remote steering device including a step up arrangement in which an output member is rotated at a faster rate as compared to a steering wheel.

Another of the principal objects of the invention is the provision of a marine propulsion device including a hollow tilt pin housing a mechanism which, in response to a rotary input, is operable to steer the propulsion unit of the marine propulsion device.

Other objects and advantages of the invention will become known by reference to the following description and accompanying drawings.

DRAWINGS

FIG. 1 is a partially schematic view, shown partially in section and fragmentarily, of a marine propulsion steering system embodying various of the features of the invention.

FIG. 2 is a fragmentary, enlarged view, partially broken away and in section, of portions of the system shown in FIG. 1.

FIG. 3 is a sectional view taken along line 3—3 of FIG. 1.

FIG. 4 is a sectional view taken along line 4—4 of FIG. 1.

Before explaining the invention in detail, it is to be understood that the invention is not limited in its application to the details of construction and arrangement of parts set forth in the following general description or illustrated in the accompanying drawings, since the invention is capable of other embodiments and of being practiced or carried out in various ways. Also, it is to be understood that the phraseology or terminology employed herein is for the purpose of description and not of limitation.

GENERAL DESCRIPTION

The drawings are illustrative of one embodiment of a marine steering system 11 which embodies various of the features of the invention. More particularly, the steering system 11 includes a marine propulsion device 13 such as an outboard motor or stern drive unit. The illustrated marine propulsion device 13 is in the form of an outboard motor including means 17, such as a clamp or transom bracket, adapted for connecting or attaching the outboard motor to a boat hull 18, together with a swivel bracket 19 connected to the boat hull attachment means 17 by a tilt pin in such manner as to afford vertical swinging movement of the swivel bracket 19 relative to the attachment means 17. The propulsion device 13 also comprises a propulsion unit 23 which includes a propeller (not shown) operable under water and which is connected to the swivel bracket 19 by means which can be in the form of a king pin 27 and which affords swinging movement of the propulsion unit 23 relative to the swivel bracket 19 about an axis transverse to the tilt pin 21, thereby affording steering of the propulsion unit 23.

The steering system also includes a remotely located steering device or actuator 31 including a housing or frame 33 adapted to be mounted on the boat hull 18, together with a shaft 37 which is rotatably carried by the housing or frame 33 and which supports a steering wheel 39.

Still further, the steering system includes a flexible cable 41 which includes an outer sheath 43 and an inner element 47 movable relative to the sheath 43. The cable 41 is connected both to the steering device 31 and to the marine propulsion device 13 so as to effect steering of the marine propulsion device 13 in response to rotation of the steering wheel 39. As thus far described, the steering system 11 is conventional.

In accordance with the invention, the inner element 47 of the flexible cable 41 is rotary and the steering device 31 includes means adapted for rotating the inner element 47 in response to rotation of the steering wheel 39. In addition, the flexible cable 41 is directly connected to the marine propulsion device 13 in such manner as to afford steering operation of the propulsion device 13 in response to rotation of the inner element 47 and without regard to lost motion or flexible connections to accommodate vertical swinging movement of the assembly of the swivel bracket 19 and the propulsion unit 23 relative to the attachment means 17.

Also in accordance with the invention, the tilt pin 21 is hollow and there is provided a linkage means 51 which is connected to the steerable propulsion unit 23, which extends, in part, through the hollow tilt pin 21, and which is connected to the rotary element 47 and is operable to steer the propulsion unit 23 in response to rotary movement of the inner cable element 47.

More specifically, the tilt pin 21 includes threaded end portions 53 and 57 and the attachment means 17 includes spaced recesses 59 and 61 respectively receiving nuts 63 and 65 threadedly received on the tilt pin end portions 53 and 57 so as to fix the tilt pin 21 relative to the attachment means 17. Bearing means, such as shown at 67, can be employed between the relatively fixed tilt pin 21 and the swivel bracket 19 to facilitate vertical swinging movement of the swivel bracket 19 relative to the tilt pin 21. Other arrangements can also be employed.

Still more specifically and further in accordance with the invention, the linkage means 51 comprises extension, in the hollow tilt pin 21, of a first member which, in the illustrated construction, is in the form of a worm shaft 69 and which is rotatably supported in the interior of the tilt pin 21 by suitable means (still to be described) and which is rotatably driven by the rotary inner element 47 of the flexible cable 41.

Also included in the steering linkage means 51 is a tubular member or slide shaft or tube 71 which is telescopically received in the hollow tilt pin 21 for axial and rotatable movement relative thereto and which, in turn, telescopically receives the worm shaft 69. Fixedly carried by the tubular slide shaft or tube 71, at the end thereof located within the tilt pin 21, is a nut 73 which meshes with the worm shaft 69 and serves the dual purpose of supporting the worm shaft 69 for rotation and of causing axial movement between the worm shaft 69 and slide tube 71 in response to rotation of the worm shaft 69.

Means are provided for preventing axial movement of the worm shaft 69 and for rotatably supporting the other end of the worm shaft 69. While other constructions are possible, in the illustrated construction, the tilt pin 21 extends outwardly from the attachment means 17 for a suitable distance and has threaded thereon, in addition to the before mentioned nut 65, an additional lock nut 77 (See especially FIG. 2) which, in assembly, is drawn tightly against the nut 65. Axially outwardly of the lock nut 77 there is threaded, on the external thread of the tilt pin 21, a female sleeve or member 79 which includes an axial bore including axially spaced internally threaded end portions 81 and 83 and a centrally located cylindrical section 87 defined, in part, by an annular shoulder 89.

Located in the axial bore is a coupling 91 having an outer enlarged portion or annular collar 93 and an axial bore including an end portion 97 threadedly receiving the worm shaft in fixed connection, a socket portion 99 at the other end, which portion 99 is non-circular in cross section and which drivingly receives a complimentary non-circular end part 111 of the inner rotary element 47 of the flexible cable 41. The axial bore also includes a central clearance portion 113 between the end portion 97 and the socket portion 99.

The coupling 91 is received in the sleeve 79 with the outer annular collar 93 received in the cylindrical sleeve section 87 and with a rotary thrust bearing 117 between one end surface of the collar 93 and the shoulder 89.

In order to prevent axial movement of the worm shaft 69 and attached coupling 91, a male stop nut 119 is threaded into the end portion 83 of the bore of the sleeve 79. The stop nut 119, in turn, includes an axial bore 120 including a counterbore portion 121 which receives a radial bearing 123 engaging the coupling 91 so as to provide bearing support for the connected coupling 91 and worm shaft 69. In addition, the interior end 127 of the stop nut 119 comprises a shoulder which engages another rotary thrust bearing 129 captured between the stop nut 119 and the other annular face of the coupling collar 93. Thus there is provided means for affording driving connection between the coupling 91 and the worm shaft 69 and for preventing axial movement of the worm shaft 69 and coupling 91, while at the same time, providing both radial and axial bearing support for the worm shaft 69 and coupling 91.

Means are provided for detachably drivingly connecting the inner rotary element 47 to the coupling 91 and for releasably connecting the flexible cable 41 to the stop nut 119 so as to prevent entry of dirt or moisture into either the flexible cable 41 or the coupling 91. While other arrangements can be employed, in the illustrated construction, the means for detachably connecting the inner rotary element 47 to the coupling 91 comprises the before mentioned socket end portion 99 of the coupling 91, which socket portion receives the end part 111 of the inner rotary element 47.

While other arrangements can be employed, in the illustrated construction, the means for releasably connecting the flexible cable 41 to the stop nut 119 so as to prevent entry of dirt or moisture into either the flexible cable 41 or the coupling 91 includes providing the outer sheath 43 of the flexible cable 41 with a fixedly extending flange or radially outwardly extending collar 131. The flange 131 includes a counterbore 133 to receive a washer 137 which is centrally apertured to permit passage therethrough of the inner rotary element 47 of the flexible cable 41, and which has an outer diameter greater than the diameter of the adjacent part of the stop nut bore 120. In addition, the connecting means includes a coupling member or tubular nut 139 which is freely rotatable on the outer sheath 43 of the flexible rotary cable 41, and which includes an axial bore 140 through which the outer sheath 47 passes, and an inner radially extending shoulder 141 engageable against the back face of the flange 131. The tubular nut 139 also includes a larger internally threaded counterbore 143 facilitating threaded receipt of the tubular nut 131 on the outer portion of the external thread of the stop nut 119 so as to fix the washer 137 in tightly sealing engagement between the flange 131 and the stop nut 119 while, at the same time, permitting free rotary movement of the inner rotary element 47 through the washer 137.

Means are provided for preventing rotary movement of the slide tube 71 relative to the propulsion unit 23 so as to cause axial movement of the slide tube 71 in response to rotary movement of the worm shaft 69 and so as to cause steering movement of the propulsion unit 23 in response to axial movement of the slide tube 71. While other constructions are possible, in the construction illustrated in FIG. 1, there is provided a link 151 which is pivotally connected at 153 in any suitable manner, about an axis parallel to the steering axis or king pin 27, to a steering lever 157 extending fixedly from the propulsion unit 23. At its other end, the link 151 is connected through any suitable means to a fitting 159 fixedly secured to the other end of the slide tube 71 so as to provide pivotal movement between the link 151 and the fitting 159 about another axis parallel to the steering axis while otherwise preventing any other relative movement therebetween.

The remotely located steering actuator or device 31 includes, as already mentioned, the housing 33 which is adapted to be mounted on the boat hull 18 at any suitable location, such as, for instance, the dashboard, together with the steering wheel shaft 37 which is rotatably mounted in the housing 33, and a steering wheel 39 keyed to the steering wheel shaft 37. While other constructions are possible, in the illustrated construction, the housing 33 is constructed in two parts including a forwardly located housing section 161 including an internal gear chamber 163 and a rearwardly located cover plate 167 including a rearwardly extending tubular portion 169 which extends through an opening 170 in the boat hull 18.

Means are provided internally of the housing 33 for drivingly connecting the steering wheel 39 to the inner rotary element 47 of the flexible cable 41 and for increasing the rate of rotation of the inner rotary element 47 as compared to the rate of rotation of the steering wheel 39. While other constructions can be employed, in the illustrated construction, the steering wheel shaft 37 is journaled adjacent to its outer end by a bearing 171 carried in the housing section 161. Non-rotatably carried by the steering wheel shaft 37, within the housing section 161, is a pinion carrier 173. Fixedly mounted on the carrier 173 (see FIG. 3) are three pins 177 which are spaced equally angularly and at a common radius from the steering wheel axis and which respectively carry compound gears 179 which, in turn, respectively include a first portion or pinion 181 in mesh with an internal gear 183 formed on the interior of the housing section 161 and a second or external gear portion 187 which is in mesh with a pinion 189 formed on a tubular output shaft or tube 191 which is journaled coaxially with the steering wheel shaft 37 and which extends, in part, in the tubular portion 169 of the cover plate 167.

More particularly, the tubular output shaft or tube 191 includes (see FIG. 2) an axial bore with an inner or forward portion 193 receiving the inner end of the steering wheel shaft 37 and rotatably supporting the inner steering wheel shaft end by means of a radial bearing 195 located between the steering wheel shaft 37 and the output tube 191. The other or rearward end of the output tube bore is of non-circular cross-section and constitutes a socket 197 which receives the adjacent end part 199 of the inner rotary element 47 of the flexible cable 41.

In order to prevent axial movement of the output tube 191 and of the steering wheel shaft 37, while affording rotary movement thereof, the output tube includes an annular shoulder 211 engaging a thrust bearing 213 which, in turn, engages an annular shoulder 217 provided in the housing cover plate 167. In addition, the inner or forward end of the output tube 191 engages another thrust bearing 219 which, in turn, engages an annular shoulder 221 on the steering wheel shaft 37. Prevention of axial movement of the steering wheel shaft 37 and output tube 191 is further provided (see FIG. 1) by formation on the steering wheel shaft 37 of forwardly located, enlarged collar or portion 223 which defines an annular shoulder engaged against still another thrust bearing 227 which, in turn, bears against an annular shoulder 229 formed in the housing section 161.

The output tube 191, as well as the steering wheel shaft 37, are further supported for rotation (See FIG. 2) by a radial bearing 231 located in a recess 233 in the cover plate 167 and engaging the outer surface of the output tube 191, whereby the output tube 191 is constrained for rotation between the radial bearing 231 supported by the cover plate 167 and the radial bearing 195 between the output tube 191 and the steering wheel shaft 37.

Means are provided for coupling the flexible cable 41 to the housing 33 and for detachably drivingly connecting the inner rotary element 47 to the output tube 191. While various arrangements can be employed, in the illustrated construction, the means for detachably drivingly connecting the inner rotary element 47 to the output tube 191 comprises, as already indicated, providing the end part 199 of the inner rotary element 47 with a non-circular cross section and removable receipt of the end part 199 in the socket 197 of the output tube 191 so as to be rotatably driven thereby. The end part 199 extends from a washer 237 which is located on the inner rotary element 47 and fixed against axial movement relative thereto so as to prevent movement of the inner rotary element 47 into the outer sheath 43. The washer 237 has an outer diameter which affords free receipt thereof within the tubular portion 169 of the cover plate 167.

Various arrangements can be employed for coupling the flexible cable to the housing. In the illustrated construction, the coupling means includes a flange 241 which extends from the outer sleeve 43 of the flexible cable 41 and which includes a counterbore portion 243 having an inner diameter corresponding generally to the inner diameter of the bore of the tubular portion 169 of the cover plate 167. Encircling the flange 243 and mounted for relative movement relative thereto is an internally threaded coupling or member 247 which is freely rotatable on the outer sheath 43 and which is threaded on an external thread 249 on the tubular portion 169 of the cover plate 167. The coupling member 247 includes an annular shoulder 251 which bears against an annular rear face on the flange 241 and, when threaded on the cover plate tubular portion 169, seats the flange 241 against the end of the tubular portion 169. This arrangement provides for limited axial movement of the inner rotary element 47 an associated washer 237 relative to the other sheath 43 of the flexible cable 41 so as to facilitate the establishment of the before mentioned seal at the connection of the flexible cable 41 with the marine propulsion 13.

Means are provided within the housing 33 for limiting rotary movement of the steering wheel 39 and thereby to limit steering movement of the marine propulsion device 13. While other arrangements are possible, the illustrated construction limits steering rotation to about four complete turns and includes respective formation, in the housing section 161, and in the carrier 173, of facing recesses 261 and 263 which are located coaxially with the steering wheel shaft 37 and which contain a plurality or a series of washers 267, four in the illustrated construction. The washer 267 adjacent to the housing section 161 includes a projection or prong 271 which is engageable with a stop or projection 273 formed in the recess 261 in the housing section 161 so as to limit rotary movement therebetween. Each of the other washers 267 includes a bent projection or prong 277 which rides on the circumference of the adjacent washer 267 during rotary movement therebetween and which in engageable with the projection 277 on the adjacent washer 267 so as to limit rotary movement therebetween. The carrier 173 also includes, in the recess 263, a projection 281 which rides on the periphery of the adjacent washer 267 so as to engage the projection 277 extending therefrom and to thereby limit relative rotation therebetween. As a result of the illustrated construction, there are five rotary faces, one between the housing section 161 and the adjacent washer 267, one between the carrier 173 and the adjacent washer 267, and three between the four adjacent washers 267. However, the circumferential extent of the interfering projections is such as to limit the available rotary movement to about four rotations of the steering wheel.

In operation, rotation of the steering wheel 39 causes associated rotation of the inner rotary element 47 and attached worm shaft 69. Rotary worm shaft movement causes axial movement of the slide tube 71 which, in turn, causes steering movement of the propulsion unit 23.

The disclosed construction provides a neat and compact arrangement and eliminates the need for providing slack in the steering system to accomodate tilting of the propulsion unit 23 about the tilt axis. Except for movement of the steering wheel 39 and propulsion unit 23 and for movement of the slide tube 71 and link 151, there are no externally movable components.

Various features of the invention are set forth in the following claims.

We claim;

1. A marine steering device comprising a housing adapted to be mounted on a bout hull and including spaced walls defining an interior chamber with an annular internal gear therein, a steering wheel shaft rotatably mounted by said housing, extending through one of said spaced walls, and including a first part extending in said chamber and a second part extending exteriorly of said chamber, a steering wheel mounted on said second steering wheel shaft part exteriorly of said housing, a carrier fixed on said first steering wheel shaft part in said chamber for common rotation with said steering wheel, an output shaft rotatably mounted by said housing, extending through the other of said spaced walls in co-axial relation to said steering wheel shaft, and having thereon a pinion located in said chamber and having common rotation with said output shaft, and means mounted on said carrier and in mesh with said internal gear and said pinion for rotatably driving said output shaft by said steering wheel shaft.

2. A steering device in accordance with claim 1 wherein said means for driving said output shaft from said steering wheel shaft comprises a plurality of compound gear members each rotatably mounted on said carrier and each including a pinion portion in mesh with said internal gear and a gear portion in mesh with said pinion.

3. A steering device in accordance with claim 1 and further including means on said housing for limiting rotation of one of said steering wheel shaft and said output shaft.

4. A steering device in accordance with claim 3 wherein said housing includes first and second members and wherein said rotation limiting means comprising a projection on one of said first and second housing members, a projection on said carrier, and a plurality of washers adjacently located in coaxial relation to each other between said projections on said one housing member and said carrier, each of said washers including a projection, said projections on said one housing member and on said carrier and on said washers successively interfering with one another to limit the extent of rotary movement between said one housing member and said carrier.

5. A marine steering device in accordance with claim 1 wherein said output shaft and said steering wheel shaft are mounted in coaxial and telescopic relation to each other.

6. A marine steering device in accordance with claim 5 wherein said output shaft has an axial bore opening into said chamber, and wherein said first part of said steering wheel shaft includes an end portion located in said bore, and further including bearing means in said bore between said end portion and said output shaft.

* * * * *